(12) United States Patent  (10) Patent No.: US 9,077,429 B2
Leclercq et al.  (45) Date of Patent: Jul. 7, 2015

(54) METHOD AND SYSTEM FOR REPURPOSING OF A GLOBAL NAVIGATION SATELLITE SYSTEM RECEIVER FOR RECEIVING LOW-EARTH ORBIT COMMUNICATION SATELLITE SIGNALS

(75) Inventors: Maxime Leclercq, Encinitas, CA (US); Ioannis Spyropoulos, La Jolla, CA (US); Nishant Kumar, San Diego, CA (US); Anand Anandakumar, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 634 days.

(21) Appl. No.: 13/413,916

(22) Filed: Mar. 7, 2012

(65) Prior Publication Data

US 2013/0107910 A1    May 2, 2013

Related U.S. Application Data

(60) Provisional application No. 61/552,566, filed on Oct. 28, 2011.

(51) Int. Cl.
*H04B 7/185*    (2006.01)

(52) U.S. Cl.
CPC .......... *H04B 7/18547* (2013.01); *H04B 7/1853* (2013.01)

(58) Field of Classification Search
CPC ....... G01S 19/28; G01S 19/42; G01S 13/878; H04B 7/18508

USPC ......... 342/352, 357.2, 357.21, 357.25, 357.4; 455/12.1, 13.2; 375/144

See application file for complete search history.

(56) References Cited

U.S. PATENT DOCUMENTS

2008/0001819 A1*  1/2008  Cohen et al. ............. 342/357.16
2011/0238308 A1*  9/2011  Miller et al. .................. 701/216

* cited by examiner

*Primary Examiner* — Dao Phan
(74) *Attorney, Agent, or Firm* — McAndrews, Held & Malloy

(57) ABSTRACT

Methods and systems for repurposing of a global navigation satellite system receiver for receiving low-earth orbit (LEO) communication satellite timing signals may comprise receiving medium Earth orbit (MEO) satellite signals and/or LEO signals in a receiver of the communication device. A radio frequency (RF) path may be configured to down-convert either of the signals, and a position of the communication device may be calculated utilizing the down-converted signals. The signals may be down-converted utilizing a local oscillator signal generated by a phase locked loop (PLL), which may be delta-sigma modulated via a fractional-N divider. A clock signal may be communicated to the PLL utilizing a temperature-compensated crystal oscillator. The signals may be down-converted to an intermediate frequency or down-converted directly to baseband frequencies. The signals may be processed utilizing surface acoustic wave (SAW) filters. In-phase and quadrature signals may be processed in the RF path utilizing a two-stage polyphase filter.

20 Claims, 7 Drawing Sheets

METHOD AND SYSTEM FOR REPURPOSING OF A GLOBAL NAVIGATION SATELLITE SYSTEM RECEIVER FOR RECEIVING LOW-EARTH ORBIT COMMUNICATION SATELLITE SIGNALS

CROSS-REFERENCE TO RELATED APPLICATIONS/INCORPORATION BY REFERENCE

This application makes reference to and claims priority to U.S. Provisional Application Ser. No. 61/552,566 filed on Oct. 28, 2011, which is hereby incorporated herein by reference in its entirety.

FIELD OF THE INVENTION

Certain embodiments of the invention relate to wireless communication. More specifically, certain embodiments of the invention relate to a method and system for repurposing of a global navigation satellite system receiver for receiving low-earth orbit communication satellite signals.

BACKGROUND OF THE INVENTION

Global navigation satellite systems (GNSS) such as the NAVSTAR global positioning system (GPS) or the Russian GLONASS provide accurate positioning information for a user anywhere on Earth that GNSS signals may be received. GNSS satellites are medium earth orbit satellites, about 12,000 miles above the surface. Highly accurate GNSS signals from these satellites may be used to accurately determine the position of a receiver and absolute time.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for repurposing of a global navigation satellite system receiver for receiving low-earth orbit communication satellite signals, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for repurposing of a global navigation satellite system receiver for receiving low-earth orbit communication satellite timing signals. Exemplary aspects of the invention may comprise receiving medium Earth orbit (MEO) satellite signals and/or low Earth orbit (LEO) satellite signals in a receiver of the communication device. A radio frequency (RF) path may be configured to down-convert either the received LEO satellite signals or the received MEO satellite signals, and a position and absolute time of the wireless device may be calculated utilizing the down-converted signals. The received LEO satellite signals or the received MEO satellite signals may be down-converted utilizing a local oscillator signal generated by a phase locked loop (PLL), which may be delta-sigma modulated, for example, via a fractional-N divider. A clock signal may be communicated to the PLL utilizing a temperature-compensated crystal oscillator or a conventional crystal oscillator. The received LEO satellite signals or the received MEO satellite signals may be down-converted to an intermediate frequency before down-converting to baseband frequencies, or may be down-converted directly to baseband frequencies. The LEO satellite signals and/or the MEO satellite signals may be processed utilizing one or more surface acoustic wave (SAW) filters before down-conversion. In-phase and quadrature signals may be processed in the RF path. The in-phase and quadrature signals may be processed utilizing a two-stage polyphase filter in the RF path.

Figure 1A:
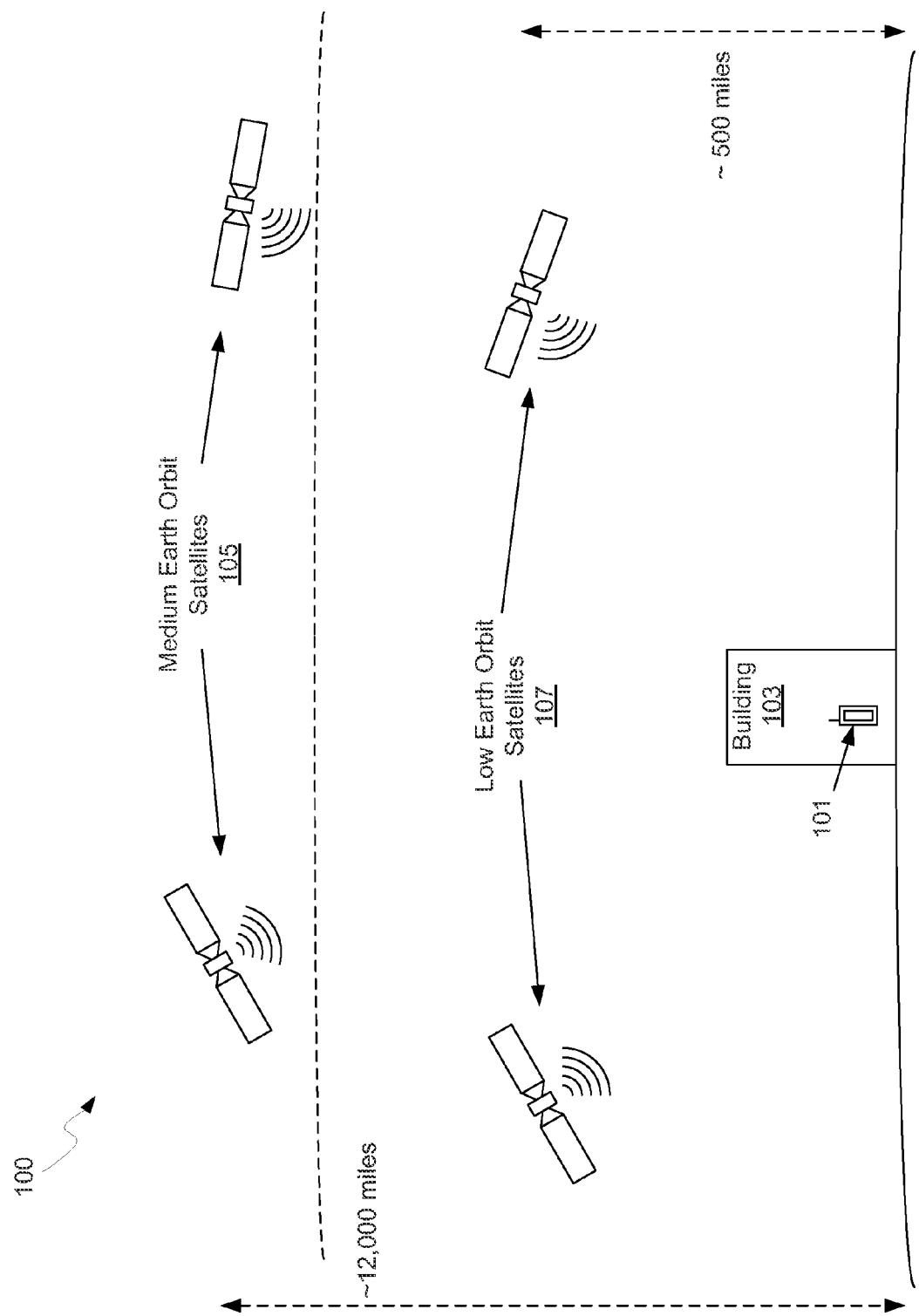
FIG. 1A is a block diagram of an exemplary repurposed global navigation satellite system in accordance with an embodiment of the invention.

FIG. 1A is a block diagram of an exemplary repurposed global navigation satellite system in accordance with an embodiment of the invention. Referring to FIG. 1, there is shown a satellite navigation system 100 comprising a handheld communication device 101, a building 103, medium Earth orbit (MEO) satellites 105, and low Earth orbit (LEO) satellites 107. There is also shown the approximate height in miles of medium Earth and low Earth satellites of ~12,000 miles and ~500 miles, respectively.

The handheld communication device 101 may comprise any device or vehicle (e.g. smart phone) where its user may desire to know the location of such device or vehicle. The handheld communication device 101 may comprise a global navigation satellite system (GLASS) receiver having a configurable RF path that may be operable to receive medium Earth orbit (MEO) satellite signals and low Earth orbit (LEO) satellite signals.

There is also shown MEO satellites (e.g. GPS satellites) 105, and LEO satellites (e.g. Iridium communication satellites) 107. The MEO satellites 105 may be at a height of about 12,000 miles above the surface of the Earth, compared to about 500 miles above the surface for the LEO satellites 107. Therefore, the signal strength of LEO satellite signals is much stronger than MEO satellite signals. The LEO satellites 107 may typically be used for telecommunication systems, such as satellite phones, whereas the MEO satellites 105 may be utilized for location and navigation applications.

In certain circumstances, MEO signals, such as GPS signals, may be attenuated by buildings or other structures to such an extent that GPS receivers cannot obtain a lock to any GPS satellites. However, due to the stronger signal strength of LEO satellite signals, the LEO signals may be utilized by devices to supplement or substitute the MEO systems in the devices. However, the frequencies utilized for MEO and LEO satellite communication are obviously not the same, so a conventional GPS receiver cannot process LEO signals, such as Iridium signals for example.

In an exemplary embodiment, a GPS receiver may be repurposed to receive LEO satellite signals, such as Iridium signals for example. In this manner, the receiver may be able to determine the user's location despite having high attenuation of GPS signals to below that of the sensitivity of the receiver. Thus, the handheld communication device 101 may be able to accurately determine its location by receiving both GPS and Iridium satellite signals even within the attenuating structure of the building 103. This may be enabled by utilizing a configurable PLL to switch to a LEO satellite signal when MEO signals are attenuated by intervening structures, such as when the wireless device 101 is taken inside a building.

Figure 1B:
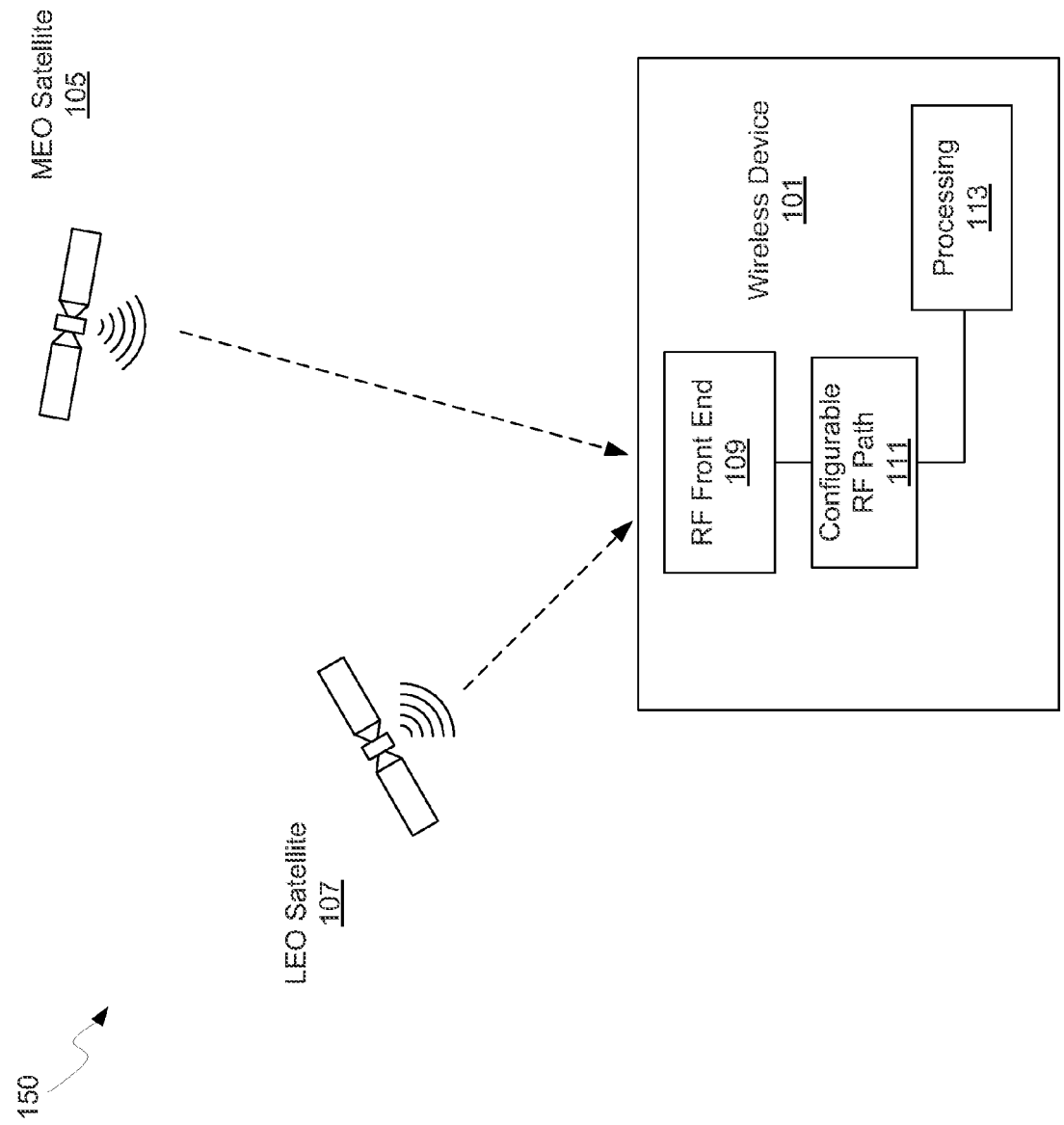
FIG. 1B is a block diagram of an exemplary repurposed global navigation satellite system in accordance with an embodiment of the invention.

FIG. 1B is a block diagram of an exemplary repurposed global navigation satellite system in accordance with an embodiment of the invention. Referring to FIG. 1B, there is shown a MEO/LEO navigation system 150 comprising the MEO satellites 105, the LEO satellites 107, and the wireless device 101. The wireless device 101 may comprise an RF front end 109, a configurable MEO/LEO RF path 111, and a processing block 113.

The RF front end 109 may comprise elements such as antennas, low-noise amplifiers (LNAs), filters, and signal splitters, for example. The RF front end 109 may thus be operable to receive, amplify, and filter RF signals for subsequent processing by the configurable RF path 111. Accordingly, the RF front end 109 may comprise a wide enough bandwidth to receive and process both LEO and MEO signals concurrently.

The configurable MEO/LEO RF path 111 may comprise amplification, down-conversion, filtering, and analog-to-digital conversion capability for received MEO and LEO signals. In this manner, the wireless device 101 may be configured to utilize either MEO or LEO satellite signals for positioning, navigation, and timing. Aspects of this are described further with respect to FIGS. 2-4.

The processing block 113 may comprise one or more CPUs (e.g. a RISC CPU or digital signal processor (DSP)) for demodulating signals and calculating positioning information, for example. The processing block 113 may be operable to configure the gain levels of amplifiers in the RF front end 109 or configure filter characteristics for improved signal to noise ratio, for example.

In operation, the wireless device 101 may be operable to receive both LEO and MEO satellite signals and configure an RF path to select the desired signal for positioning and navigation services. For example, if the wireless device 101 is utilizing MEO satellite signals for navigation but then enters a structure that attenuates MEO signals below a sensitivity threshold, the configurable MEO/LEO path 111 may be configured to down-convert LEO signals for positioning and navigation purposes. The processing block 113 may utilize a received signal strength indicator (RSSI) to determine that the MEO signals are inadequate for positioning and navigation purposes, and subsequently configure the configurable MEO/LEO path 111 to switch to LEO signals.

Figure 2:
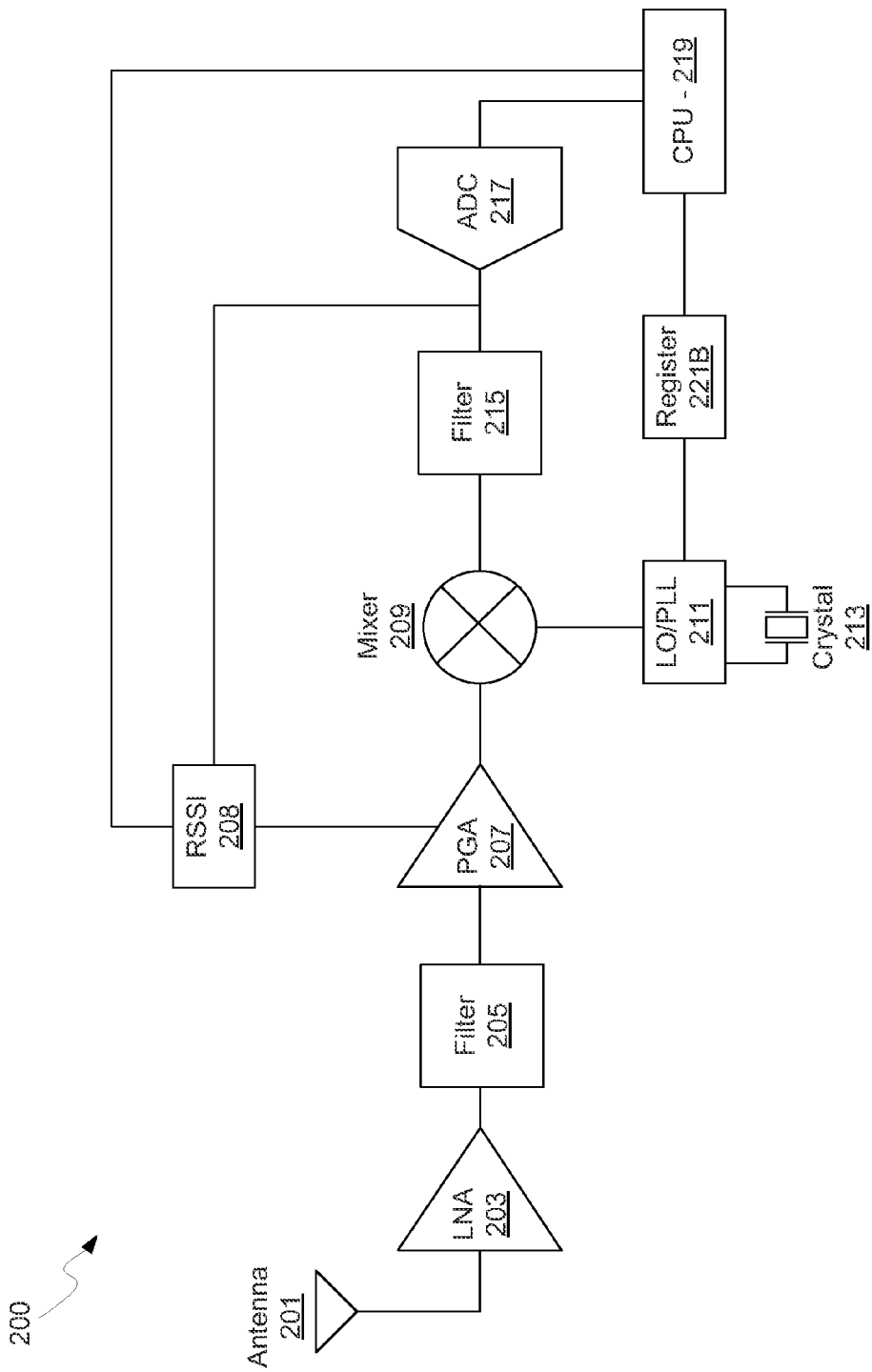
FIG. 2 is a diagram illustrating an exemplary radio frequency receiver, in accordance with an embodiment of the invention.

FIG. 2 is a diagram illustrating an exemplary radio frequency receiver, in accordance with an embodiment of the invention. Referring to FIG. 2, there is shown a receiver 200 comprising an antenna 201, a low noise amplifier (LNA) 203, a filter module 205, a programmable gain amplifier (PGA) 207, a receive signal strength indicator (RSSI) 208, a mixer 209, a local oscillator (LO)/phase locked loop (PLL) 211, a crystal oscillator 213, a filter module 215, an analog-to-digital converter (ADC) 217, a central processing unit 219, and a register 221B.

The antenna 201 may be operable to receive RF signals for subsequent processing by the other elements of the receiver 200. The antenna 201 may comprise a single antenna with wide enough bandwidth to receive both LEO and MEO signals, may comprise a tunable antenna to cover the desired frequency range, or may comprise more than one antenna for receiving signals, each for receiving signals in one of a plurality of frequency ranges.

The LNA 203 may be operable to provide amplification to the signals received by the antenna 201, with the amplified signal being communicated to the filter 205. Similarly, the PGA 207 may provide amplification to signals received from the filter module 205. The filter module 205 may comprise active and/or passive filters for removing unwanted signals while allowing desired signals to pass to the PGA 207. In an exemplary scenario, the filter module 205 comprises a surface acoustic wave (SAW) filter. The PGA 207 may be configured by a processor, such as the CPU 219.

The RSSI module 208 may comprise circuitry for determining the magnitude of a received signal, and may sense signal strengths at the PGA 207 or for down-converted signals after the filter 215, for example. Accordingly, the RSSI module 208 may be operable to sense signal strength at any point along the receiver 200 and may be coupled to the CPU 219 for configuring gain levels in the RF path, for example, from the measured RSSI levels.

The mixer 209 may comprise circuitry that is operable to generate output signals at frequencies that are the sum and the difference between the input RF signal and the local oscillator signal received from the LO/PLL 211. The frequency of $LO_I$ and $LO_Q$ may be configured such that the desired signal is at baseband such that unwanted higher frequency signals may be filtered out by a low pass filter, such as the filter module 215.

In another exemplary scenario, the mixer 209 may down-convert the received RF signals to an intermediate frequency (IF) for further processing, as opposed to down-converting directly to baseband. In this scenario, the filter module 215 may comprise a bandpass filter that is configured to pass the desired IF signals while filtering out the undesired low and high frequency signals.

The LO/PLL 211 may comprise circuitry that is operable to generate an RF signal to enable down-conversion of RF signals received by the mixer 209. The LO/PLL 211 may comprise a voltage-controlled oscillator, for example, with a PLL to stabilize the frequency of the output signal communicated to the mixer 209.

The crystal oscillator 213 may comprise a stable clock source for the receiver 200, and may comprise a piezoelectric crystal, for example, that outputs a stable clock signal at a given temperature.

The ADC 217 may comprise circuitry that is operable to convert analog input signals to digital output signals. Accordingly, the ADC 217 may receive baseband or IF analog signals from the mixer 209 and may generate digital signals to be communicated to the CPU 219.

The CPU 219 may comprise a processor similar to the processor 113, for example, described with respect to FIG. 1. Accordingly, the CPU 219 may be operable to control the functions of the receiver 200 and may process received baseband or IF signals to demodulate, decode, and/or perform other processing techniques to the received data. Other processing techniques may comprise positioning calculations based on received satellite signals. The CPU 219 may thus be operable to demodulate and decode both MEO and LEO satellite data, such as GPS and Iridium data for example. In an exemplary scenario, the CPU 219 may be accelerated with dedicated hardware, not shown, such as fast Fourier transform (FFT) engines and correlators, for example.

The register 221B may comprise a memory register for storing a configuration to be communicated to the LO/PLL to down-convert MEO or LEO signals. The register 221B may communicate an output signal to the LO/PLL 211 that indicates the desired frequency signal to down-convert to IF or baseband.

Figure 3:
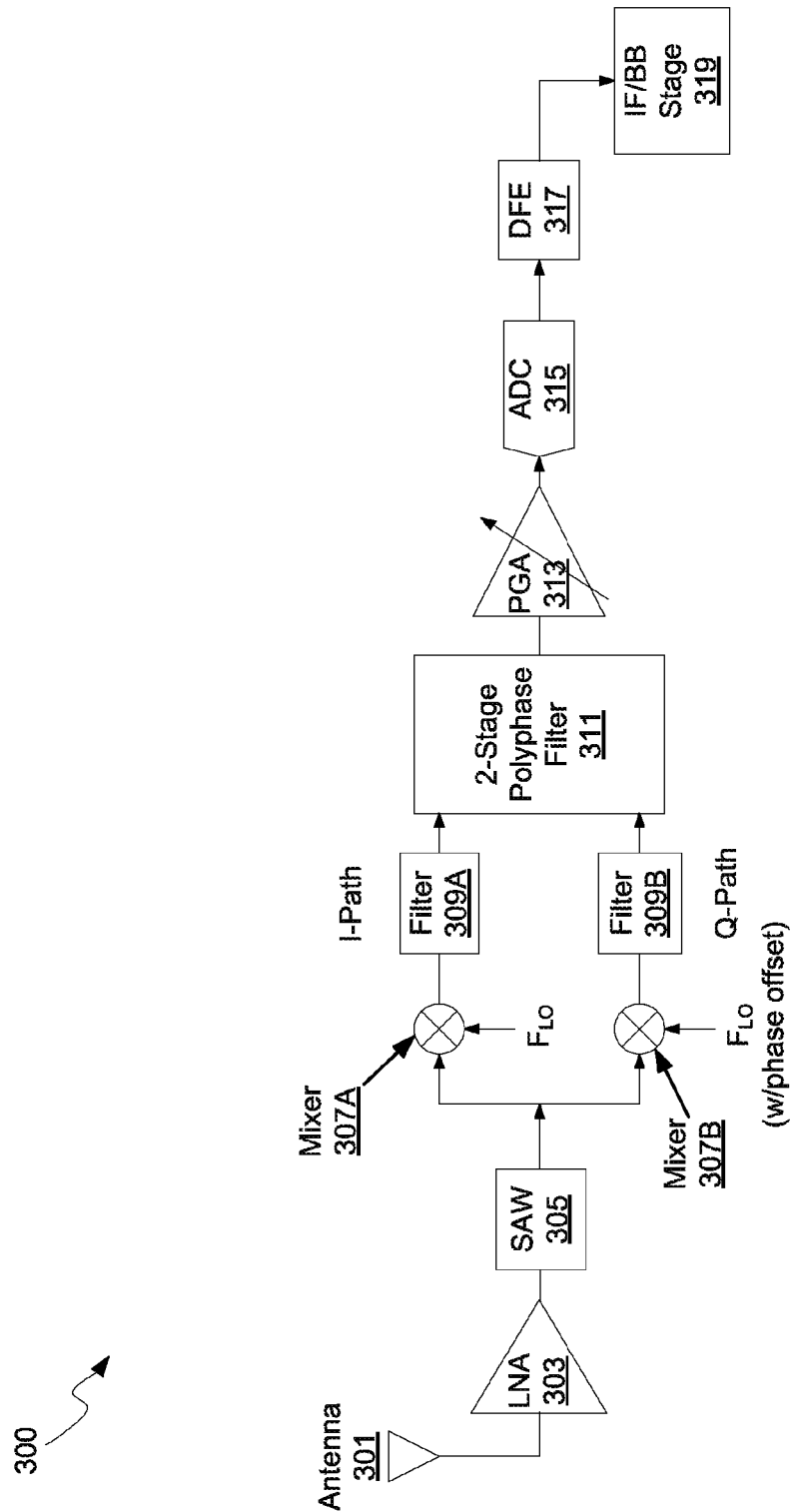
FIG. 3 is a diagram illustrating an exemplary in-phase and quadrature RF front end, in accordance with an embodiment of the invention.

In an exemplary scenario, the receiver may comprise two separate RF paths for processing in-phase and quadrature (I and Q) signals, as described further with respect to FIG. 3 for example.

FIG. 3 is a diagram illustrating an exemplary in-phase and quadrature RF front end, in accordance with an embodiment of the invention. Referring to FIG. 3, there is shown the I and Q RF path 300 comprising an antenna 301, an LNA 303, a SAW filter 305, mixers 307A and 307B, filters 309A and 309B, a 2-stage polyphase filter 311, a PGA 313, an ADC 315, a digital front end (DFE) 317, and an IF/baseband stage 319. The antenna 301, the LNA 303, the SAW filter 305, the mixers 307A and 307B, the filters 309A and 309B, the PGA 313, and the ADC 315 may be substantially similar to similarly named elements described with respect to FIG. 2.

The mixers 307A and 307B may receive input signals from the SAW filter 305 and local oscillator signals at frequency $F_{LO}$, and 90 degree phase difference, to down-convert the received I and Q signals.

The 2-stage polyphase filter 311 may comprise circuitry for providing I and Q signal image rejection of intermediate or baseband signals received from the filters 309A and 309B. This has an advantage over integrating filters prior to the mixers 307A and 307B to reduce image signals because this would require very high Q factors. The 2-stage polyphase filter 311 may comprise a notch frequency of $-F_{IF}$.

In an exemplary scenario, the ADC 315 may comprise a sigma-delta converter. The DFE 317 may comprise circuitry that is operable to decimate the digital signal received from the ADC 315. In an exemplary scenario, the ADC 315 may generate a 1-bit output signal at a frequency $F_{ADC}$, and the DFE 317 may then decimate the received signal by 16 to result in a 6 bit IF signal with a sampling frequency of $F_{LO}/96$.

The IF/baseband stage 319 may comprise circuitry for further processing of the IF or baseband signals received from the DFE 317. For example, if the DFE 317 output signal is an IF signal, the IF/baseband stage 319 may comprise further down-conversion capability. In addition, the IF/baseband stage 319 may comprise filtering and decimation capability for further processing of the received signals.

In operation, the I and Q RF path 300 may receive an RF signal via the antenna 301. The LNA 303 may provide amplification to the received signal before being filtered by the SAW filter 305. The SAW filter 305 may comprise a filter with wide enough bandwidth for both LEO and MEO signals or may be configurable to different frequency ranges. In another exemplary scenario, the SAW filter 305 may comprise a plurality of filters that may be selectively enabled so that only desired signals are passed to the mixers 307A and 307B.

The mixers 307A and 307B may receive the filtered RF signals and local oscillator signals $F_{LO}$ that are 90 degrees out of phase for down-converting I and Q signals to IF or baseband frequencies. The resulting IF or baseband signals may be filtered by the filters 309A and 309B and the 2-stage polyphase filter 311 before being amplified by the PGA 313. The 2-stage polyphase filter 311 may provide image rejection in instances where image signals interfere with the desired signals. The PGA 313 may receive a gain control signal from a processor, such as the CPU 219 described with respect to FIG. 2.

The ADC 315 may convert the amplified and filtered IF/baseband signal to a digital signal for further processing in the digital domain. For example, the DFE 317 and the IF/baseband stage 319 may decimate and filter the digital signal received from the ADC 315. In addition, the IF/baseband stage 319 may comprise a positioning engine for determining the location of the wireless device comprising the I and Q RF front end 300. The position may be determined from accurate timing signals received from a plurality of LEO or MEO satellite signals in conjunction with ephemeris data for the satellites.

Figure 4:
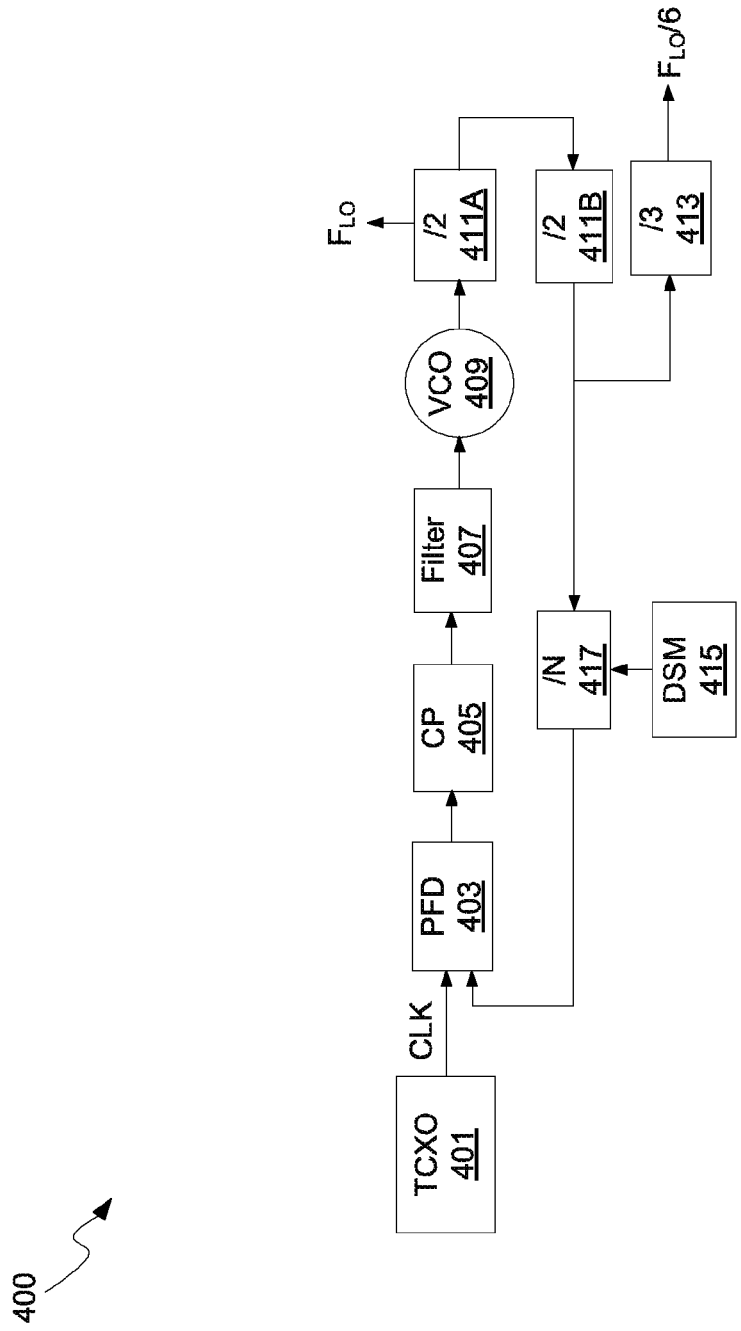
FIG. 4 is a diagram illustrating an exemplary phase locked bop, in accordance with an embodiment of the invention.

FIG. 4 is a diagram illustrating an exemplary phase locked loop, in accordance with an embodiment of the invention. Referring to FIG. 4, there is shown a phase locked loop (PLL) 400 comprising a temperature-compensated crystal oscillator (TXCO) 401, a phase-frequency detector (PFD) 403, a charge pump 405, a loop filter 407, a voltage-controlled oscillator (VCO) 409, divide-by-2 modules 411A and 411B, a divide-by-3 module 413, a delta-sigma modulator (DSM) 415, and a fractional-N divider 417. There is also shown a clock signal CLK and output signals $F_{LO}$ and $F_{LO}/6$.

The TCXO 401 may comprise a crystal oscillator that is capable of providing a stable clock signal, CLK, over an operational temperature range. The TCXO 401 may thus provide the base clock signal for the PLL 400 that is communicated to the PFD 403.

The PFD 403 may comprise circuitry that is operable to sense a phase difference between received input signals, such as the signals received from the TCXO 401 and the fractional-N divider 417. The PFD 403 may output a phase error signal, which is proportional to the phase difference between the two input signals. This error signal may be communicated to the charge pump 405 for adjustment purposes.

The charge pump 405 may comprise circuitry that is operable to adjust a frequency of the VCO 409 via the filter 407. The charge pump 405 may receive an error signal from the PFD 403 that is proportional to the phase difference between input clock signals. Accordingly, the charge pump 405 may generate an output signal that increases or decreases the oscillation frequency of the VCO 409.

The loop filter 407 may comprise a low-pass filter, for example, that filters out noise signals and allows a control signal to pass from the charge pump 405 to the VCO 409. Removing spurious signals and noise fluctuations may increase the stability of the PLL 400.

The VCO 409 may comprise circuitry that is operable to generate a clock signal at a frequency configured by an input voltage. Accordingly, the frequency of the output signal generated by the VCO 409 may be proportional to the magnitude of the voltage of the input signal received from the charge pump 405 via the loop filter 407. The output signal may then be communicated to the divide-by-2 modules 411A and 411B, which may comprise frequency dividers. The divide-by-2 module 411A may generate an output signal $F_{LO}$, which may correspond to the $F_{LO}$, described with respect to FIG. 3, and may also communicate an output signal to the divide-by-2 module 411B for a second halving of the frequency.

The divide-by-2 module 411B may communicate an output signal to the divide-by-3 module 413 and the fractional-N divider 417. The divide-by-3 module 413 may divide the frequency again by 3, resulting in an output signal $F_{LO}/6$. The fractional-N divider 417 may divide the frequency of the input signal by a configurable factor, thereby enabling accurate frequency control of the PLL 400 over a plurality of steps in a frequency range.

The fractional-N divider 417 may receive a modulus control signal from the DSM 415. The value of N may be configured to hop between two values so that the VCO 409 alternates between one locked frequency and the other. The VCO 409 may then stabilize at a frequency that is the time average of the two locked frequencies. By varying the percentage of time that the fractional-N divider 417 spends at the two divider values, the frequency of the locked VCO 409 may be configured with very fine granularity.

In an exemplary scenario, the DSM 415 may enable the PLL 400 to hop between frequencies in a pseudo-random fashion to create noise shaping that reduces the phase noise of the system. The PLL 400 may thus be operable to provide a plurality of stable clock signals based on a TCXO output, and with small incremental steps in output frequency configured by the fractional-N divider 417. The output of the divide-by-3 module 413 may comprise a clock signal for the ADC 315, for example, as described with respect to FIG. 3.

Figure 5:
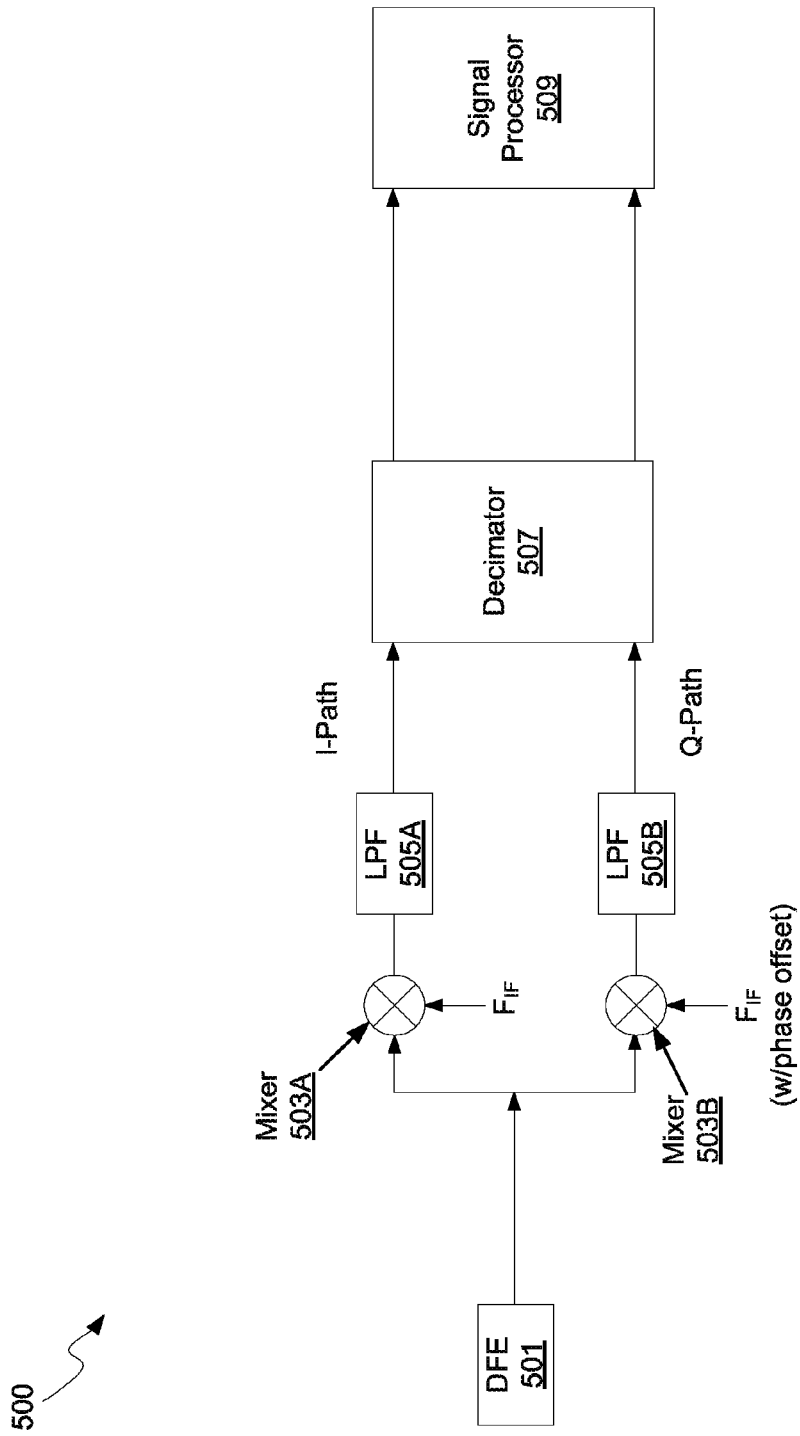
FIG. 5 is a diagram illustrating an exemplary intermediate frequency path, in accordance with an embodiment of the invention.

FIG. 5 is a diagram illustrating an exemplary intermediate frequency path, in accordance with an embodiment of the invention. Referring to FIG. 5, there is shown an IF path 500 comprising a DFE 501, mixers 503A and 503B, low-pass filters 505A and 505B, a decimator 507, and a signal processor 506.

The IF path 500 may correspond to the DFE 317 and the IF/baseband stage 319 as described with respect to FIG. 3, for example. Similarly, the mixers 503A and 503B may be substantially similar to the mixers 307A and 307B of FIG. 3, for example, but with different local oscillator frequencies. For example, the mixers 503A and 503B may receive local oscillator signals $F_{IF}$, and $F_{IF}$ with a 90 degree phase shift, respectively, to down-convert an IF signal to baseband for further processing by the decimator 507 and the signal processor 509.

The LPFs 505A and 505B may be operable to filter out higher frequency signals while allowing low frequency, or baseband, signals to pass. The decimator 507 may comprise circuitry that is operable to reduce the sampling rate of the digital input signal. For example, the decimator 507 may decimate the sampling rate by a factor of 64, before communicating the resulting signal to the signal processor 509.

The signal processor 509 may comprise a CPU, for example, that may be operable to calculate positioning and navigation information from received satellite signals. For example, the signal processor 509 may comprise an assisted-GPS positioning engine that is operable to calculate the position of the wireless device 101 from received LEO or MEO satellite signals and stored and/or retrieved ephemeris data.

By enabling the down-conversion of both MEO and LEO signals, the signal processor 509 may determine position and navigation information in areas where MEO signals are too attenuated. Similarly, the signal processor 509 may alternate between MEO and LEO signal data or use data from one signal type to assist in the positioning calculation and/or timing synchronization of the other type of signal. The configuration of a wireless device to receive both LEO and MEO signals may greatly reduce space requirements as the configurable RF path 111 may be integrated on a single chip, as opposed to multiple RF paths, each for a different signal type.

In addition, using timing information from the strongest system may significantly help the weaker system to acquire its signals and thus improve overall performance, such as when MEO signals are weak, where the LEO signals may be used to assist the MEO system.

Figure 6:
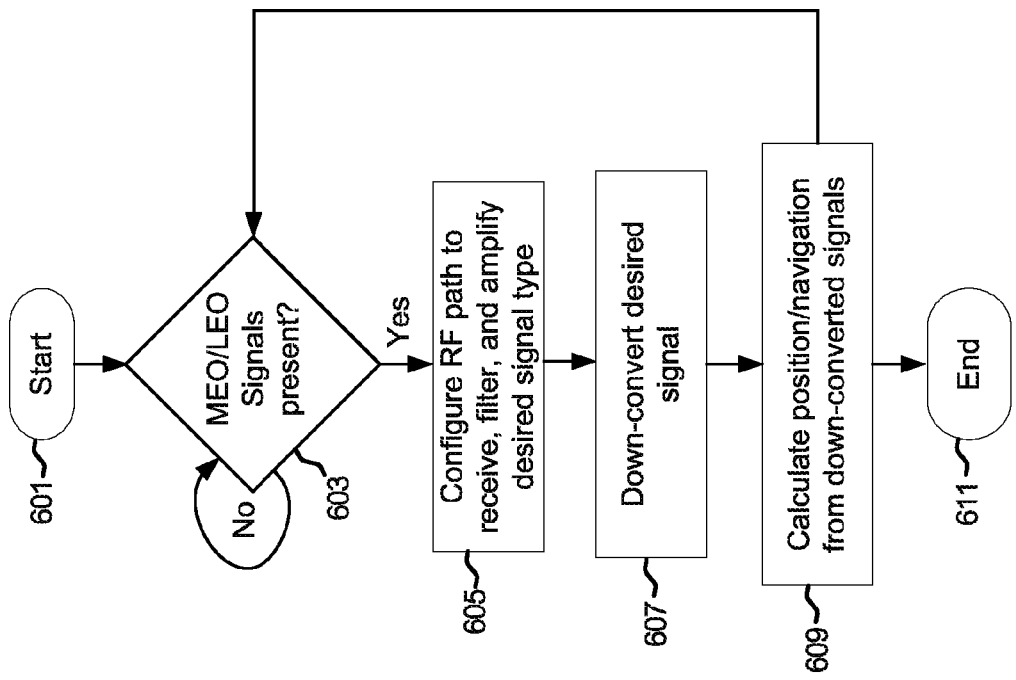
FIG. 6 is a block diagram illustrating exemplary steps for repurposing of a global navigation satellite system receiver for receiving low-earth orbit communication satellite timing signals, in accordance with an embodiment of the invention.

FIG. 6 is a block diagram illustrating exemplary steps for repurposing of a global navigation satellite system receiver for receiving low-earth orbit communication satellite timing signals, in accordance with an embodiment of the invention. The exemplary method illustrated in FIG. 6 may, for example, share any or all functional aspects discussed previously with regard to FIGS. 1-5.

Referring to FIG. 6, after start step 601, in step 603, the wireless device may determine whether LEO and/or MEO signals are present. If yes, the exemplary steps may proceed to step 605 where the RF path may be configured to receive, filter, and amplify the desired signal type. In step 607, the received, filtered, and amplified signal may be down-converted to IF to subsequently be converted to baseband frequencies, or may be down-converted directly to baseband frequencies. The local oscillator signal for the down-conversion may be generated via a delta-sigma modulated phase locked loop (DSM PLL), such that both LEO and MEG signal frequencies may be received and down-converted.

In step 609, the received and down-converted signals may be demodulated and decoded to extract accurate timing information for calculating the position of the wireless device. This is followed by end step 611.

In an embodiment of the invention, a method and system may comprise receiving medium Earth orbit (MEO) satellite signals and/or low Earth orbit (LEO) satellite signals in a receiver of the communication device 101. A radio frequency (RF) path 200, 300 may be configured to down-convert either the received LEO satellite signals or the received MEO satellite signals, and a position of the wireless device 101 may be calculated utilizing the down-converted signals. Absolute time of the communication device 101 may be synchronized utilizing the down-converted signals.

The received LEO satellite signals or the received MEO satellite signals may be down-converted utilizing a local oscillator signal $F_{LO}$ generated by a phase locked loop (PLL) 211, 400, which may be delta-sigma modulated 415 via a fractional-N divider 417. A clock signal CLK may be communicated to the PLL 211, 400 utilizing a temperature-compensated crystal oscillator 401. The received LEO satellite signals or the received MEO satellite signals may be down-converted to an intermediate frequency before down-converting to baseband frequencies, or may be down-converted directly to baseband frequencies.

The LEO satellite signals and/or the MEO satellite signals may be processed utilizing one or more surface acoustic wave (SAW) filters 305. In-phase and quadrature signals, I-Path and Q-Path, may be processed in the RF path 300. The in-phase and quadrature signals may be processed utilizing a two-stage polyphase filter 311 in the RF path 300.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for repurposing of a global navigation satellite system receiver for receiving low-earth orbit communication satellite signals.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
  in a communication device that is capable of receiving both medium Earth Orbit (MEO) satellite signals and low Earth orbit (LEO) satellite signals:
    receiving MEO satellite signals and/or LEO satellite signals in a receiver of said communication device;
    configuring a radio frequency (RF) path to down-convert either said received LEO satellite signals or said received MEO satellite signals;
    calculating a position of said wireless device utilizing said down-converted signals; and
    synchronizing local time of said communication device utilizing said down-converted signals.

2. The method according to claim 1, comprising down-converting said received LEO satellite signals or said received MEO satellite signals utilizing a local oscillator signal generated by a phase locked loop (PLL).

3. The method according to claim 2, comprising delta-sigma modulating said PLL.

4. The method according to claim 2, comprising delta-sigma modulating said PLL via a fractional-N divider.

5. The method according to claim 2, comprising communicating a clock signal to said PLL utilizing a temperature-compensated crystal oscillator.

6. The method according to claim 1, comprising down-converting said received LEO satellite signals or said received MEO satellite signals to an intermediate frequency before down-converting to baseband frequencies.

7. The method according to claim 1, comprising down-converting said received LEO satellite signals or said received MEO satellite signals directly to baseband frequencies.

8. The method according to claim 1, comprising processing said LEO satellite signals and/or said MEO satellite signals utilizing one or more surface acoustic wave (SAW) filters.

9. The method according to claim 1, comprising processing in-phase and quadrature signals in said RF path.

10. The method according to claim 1, comprising processing said in-phase and quadrature signals utilizing a two-stage polyphase filter in said RF path.

11. A system for wireless communication, the system comprising:
  one or more circuits for use in a communication device that is capable of receiving both medium Earth Orbit (MEO) satellite signals and low Earth orbit (LEO) satellite signals, said one or more circuits being operable to:
    receive MEO satellite signals and/or LEO satellite signals in a receiver of said communication device;
    configure a radio frequency (RF) path to down-convert either said received LEO satellite signals or said received MEO satellite signals;
    calculate a position of said wireless device utilizing said down-converted signals; and
    synchronize local time of said communication device utilizing said down-converted signals.

12. The system according to claim 11, wherein said one or more circuits are operable to down-convert said received LEO satellite signals or said received MEO satellite signals utilizing a local oscillator signal generated by a phase locked loop (PLL).

13. The system according to claim 12, wherein said one or more circuits are operable to delta-sigma modulate said PLL.

14. The system according to claim 12, wherein said one or more circuits are operable to delta-sigma modulate said PLL via a fractional-N divider.

15. The system according to claim 12, wherein said one or more circuits are operable to communicate a clock signal to said PLL utilizing a temperature-compensated crystal oscillator.

16. The system according to claim 11, wherein said one or more circuits are operable to down-convert said received LEO satellite signals or said received MEO satellite signals to an intermediate frequency before down-converting to baseband frequencies.

17. The system according to claim 11, wherein said one or more circuits are operable to down-convert said received LEO satellite signals or said received MEO satellite signals directly to baseband frequencies.

18. The system according to claim 11, wherein said one or more circuits are operable to process said LEO satellite signals and/or said MEO satellite signals utilizing one or more surface acoustic wave (SAW) filters.

19. The system according to claim 11, wherein said one or more circuits are operable to process in-phase and quadrature signals in said RF path.

20. A system for wireless communication, the system comprising:
one or more circuits for use in a communication device that is capable of receiving both medium Earth Orbit (MEO) satellite signals and low Earth orbit (LEO) satellite signals, said one or more circuits being operable to:
receive MEO satellite signals and/or LEO satellite signals in a receiver of said communication device;
configure a radio frequency (RF) path to down-convert either said received LEO satellite signals or said received MEO satellite signals;
process in-phase and quadrature signals in said RF path;
calculate a position of said wireless device utilizing said down-converted signals; and
synchronize local time of said communication device utilizing said down-converted signals.

* * * * *